JOHN GIRE.
Improvement in Churns.

No. 119,840. Patented Oct. 10, 1871.

Witnesses:
Jas. E. Hutchinson
C. L. Evert

Inventor
John Gire
per Alexander Mason
Attys.

UNITED STATES PATENT OFFICE.

JOHN GIRE, OF LOUDEN CITY, ILLINOIS.

IMPROVEMENT IN CHURNS.

Specification forming part of Letters Patent No. 119,840, dated October 10, 1871.

*To all whom it may concern:*

Be it known that I, JOHN GIRE, of Louden City, in the county of Fayette and in the State of Illinois, have invented certain new and useful Improvements in Churns; and do hereby declare that the following is a full, clear, and exact description thereof, reference being had to the accompanying drawing and to the letters of reference marked thereon making a part of this specification.

The nature of my invention consists in the construction and arrangement of a churn, as will be hereinafter more fully set forth.

In order to enable others skilled in the art to which my invention appertains to make and use the same, I will now proceed to describe its construction and operation, referring to the annexed drawing, in which—

Figure 1:
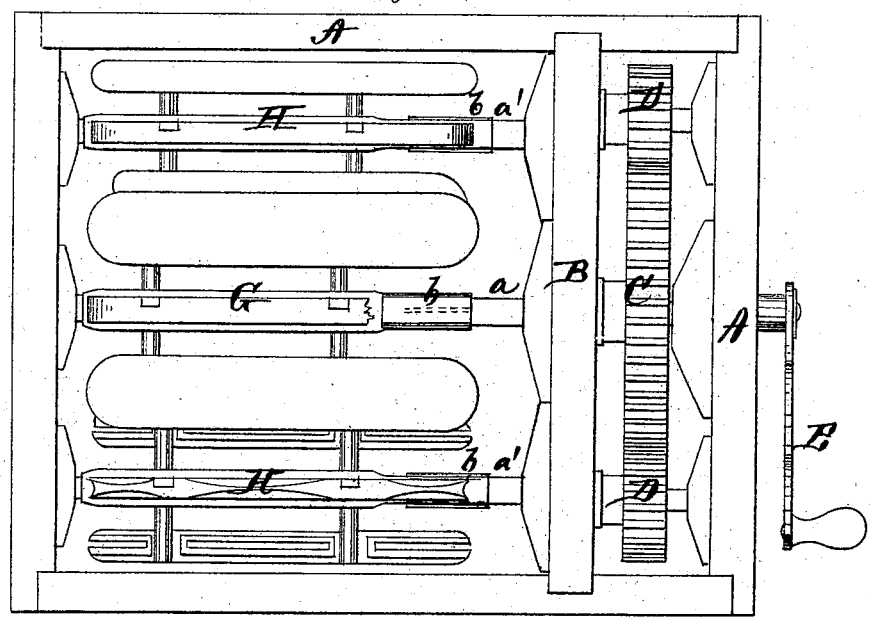
Figure 2:
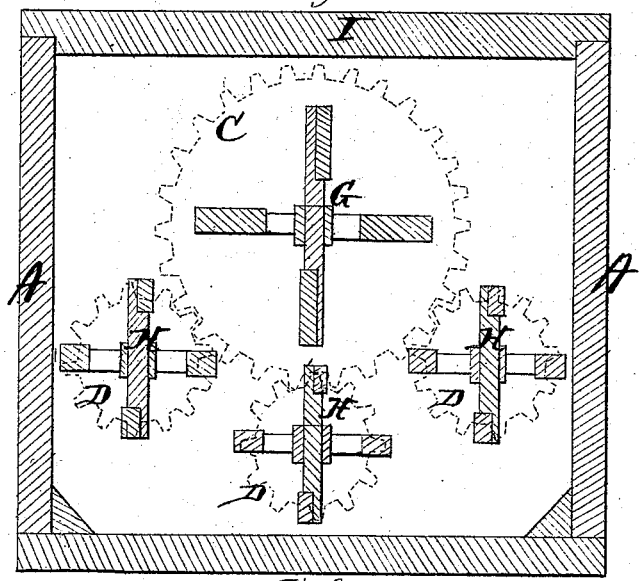
Figure 3:

Figure 1 is a plan view, and Fig. 2 a transverse vertical section of my churn. Fig. 3 is a longitudinal vertical section of one end of the reel-shaft.

A represents a box of any suitable dimensions provided near one end with a vertical partition, B, which divides the box into two compartments, one narrow one for the gearing and the other larger one forming the churn proper. In the narrow compartment are arranged one large cog-wheel, C, and three smaller ones, D D, in the manner shown in Fig. 2. The journals of the large cog-wheel C pass through the partition B and through the end of the box. Upon the outer journal is placed a crank, E, by means of which the churning mechanism is operated. The outer journals of the smaller cog-wheels D D rest in boxes on the inner side of the end of the box, while the inner journals pass through the partition B. All the inner journals marked $a$ and $a'$, are square at the ends to receive a sliding socket, $b$, placed upon the end of each of the reel-shafts. G represents a large reel, and H H three smaller reels, the shafts of all of which have their outer bearings in boxes attached to the end of the box, while their inner ends are, by means of the sockets $b$ $b$, connected with the journals $a$ $a'$, respectively—that is, the large reel G is connected with the journal $a$ of the large cog-wheel C, while the smaller reels H H are connected with the journals $a'$ of the smaller cog-wheels D D. Within each sliding socket $b$ and in the reel-shaft is a spring, $i$, to hold the socket in place when moved upon the journal. The smaller reels have three revolutions to one of the large reel, and the small reels do the churning while the larger gathers the butter as it rises to the top in the churn. The dashers or wings on the reels may be made in any desired manner, rough or smooth, solid or perforated. By pressing downward on the springs $i$ $i$ the sockets or couplings $b$ $b$ may be moved back on the reel-shafts and the reels taken out. The butter is then taken out and the milk drawn off at the end of the churn, at or near the bottom. This churn is secured from leaking by rubber washers placed around the cog-wheel journal. The entire box A is covered by a lid, I.

Having thus fully described my invention, what I claim as new, and desire to secure by Letters Patent, is—

The combination of the four removable dasher-reels G H H H, springs $i$, movable sleeves $b$, and short journals $a$ $a'$, all constructed as described and arranged within the box A, with partition B and cog-wheels C and D D, as set forth.

In testimony that I claim the foregoing I have hereunto set my hand this 25th day of July, 1871.

JOHN GIRE.

Witnesses:
SAML. L. RANNEY,
I. H. JOHNSTON.

(45)